United States Patent [19]

Wallace

[11] 3,856,235

[45] Dec. 24, 1974

[54] MAGNETIC TAPE CONTROL ARM

[76] Inventor: Robert S. Wallace, 2881 S. Robertson Blvd., Los Angeles, Calif. 90034

[22] Filed: Mar. 12, 1973

[21] Appl. No.: 340,120

[52] U.S. Cl. .................................. 242/199, 242/76
[51] Int. Cl. .......................................... G11b 23/10
[58] Field of Search ............ 242/199, 200, 198, 76, 242/71.2, 210; 179/100.22; 226/196; 352/72, 78 R

[56] References Cited

UNITED STATES PATENTS

| | | | |
|---|---|---|---|
| 1,953,985 | 4/1934 | Kindelmann et al. | 242/71.2 |
| 2,105,254 | 1/1938 | Martin | 242/71.2 X |
| 2,353,044 | 7/1944 | Kriegsheim | 242/71.2 |
| 3,493,161 | 2/1970 | Billings et al. | 242/76 X |

*Primary Examiner*—George F. Mautz
*Attorney, Agent, or Firm*—William W. Haefliger

[57] ABSTRACT

An elongated cantilevered arm has a first portion to be supported in a magnetic tape cassette or cartridge case, and a second portion spaced from the first portion to engage and bias the tape. The arm second portion defines a tape receiving channel, and it has ribbing projecting in the channel to slidably engage and seat a non-track portion of the tape.

9 Claims, 5 Drawing Figures

MAGNETIC TAPE CONTROL ARM

BACKGROUND OF THE INVENTION

This invention relates generally to magnetic tape cassettes or cartridges, and more particularly concerns the provision of means to guide the tape onto and off a flangeless roll or rolls within case structure, and to retain the tape in wound condition on such rolls.

The lightweight tape used in conventional Phillips cassettes tends at times to spill off the flangeless reels employed; also the tape may at times tend to wind in a non-uniform manner on the tape rolls. There is need for improved apparatus preventing these unwanted conditions.

SUMMARY OF THE INVENTION

It is a major object of the invention to provide improved apparatus to overcome the above problems. The present invention basically comprises an elongated cantilevered arm having a first portion to be supported in the case and a second portion to engage and bias the tape, that second portion defining a tape receiving channel and ribbing projecting in the channel to slidably engage and seat only a non-track portion of the tape. As will be seen, the first portion of the arm may define a fulchrum to be pivotally supported in the case; the intermediate arm extent may be bowed to remain out of engagement with the tape roll and it may be resiliently flexible to bias the second portion into engagement with the tape; a third portion of the arm may be provided like the second portion but oppositely spaced from the fulchrum so that both tape rolls remain engaged; one or both such portions may comprise a roller; the ribbing may comprise multiple ribs longitudinally elongated in the direction of tape travel through the channel; and the channel may have opposed walls tapered at angles to funnel the tape into the channel, as will be described.

As a result, the arm may be placed in position in the case before the tape is run in; only a very small portion of the tape will be contacted by the arm; such contact is never with the recording tracks to prevent wear thereof; staticelectricity build-up is reduced or prevented; and the tape is prevented from spilling off the rolls.

These and other objects and advantages of the invention, as well as the details of illustrative embodiments, will be more fully understood from the following description and drawings, in which:

DRAWING DESCRIPTION

DETAILED DESCRIPTION

Figure 1:
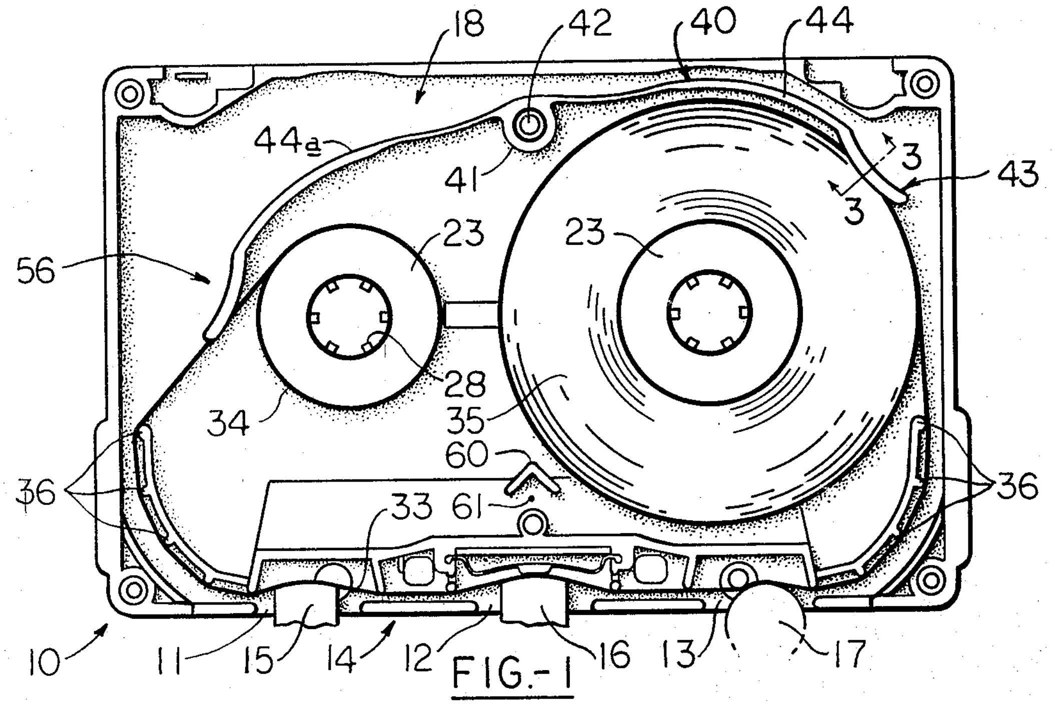
FIG. 1 is a plan view of a tape cassette assembly interior.

In the drawings, one form of tape cassette includes a case 10 of generally rectangular shape with apertures 11–13 spaced along the front edge 14 for exposing a tape segment 33 traveling adjacent such zones to contact with playback unit heads. The latter may include erase head 15, record or playback head 16 and pressure roller 17. The case includes shallow receptacle and cover elements 18 and 19 which may be suitably interconnected in conventional manner.

The assembly includes tape reel means, as for example the two tape reels 23 mounted to rotate within the case on and in conjunction with posts incorporated on a playback unit, the posts meshing with radial projections 28 on the reels, for driving engagement therewith. See in this regard, for example, U.S. Pat. No. 3,495,787 to Wallace. While the reel means is described herein in connection with two reels, it is equally applicable to a single reel assembly, as for example is described in U.S. Pat. application Ser. No. 156,732, filed June 25, 1971, to Wallace, now U.S. Pat. No. 3,773,272.

The tape typically passes between tape rolls 34 and 35 on the reels as the tape unwinds off the roll on one reel and winds on the roll on the other reel in response to post rotation. The tape typically may have multiple tracks, as for example two tracks, one for use with the magnetic head when the tape loop 33 travels in one direction, and the other track for use with the magnetic head when the tape loop travels in the opposite direction, as for example when the cassette is inverted on the playback unit. Note the touch points 36 integrally molded to the receptacle, and located to guide the tape at the corners of the case, with much greater turn radii than is possible when using rollers at those corners.

Figures 2, 3, 4, 5:
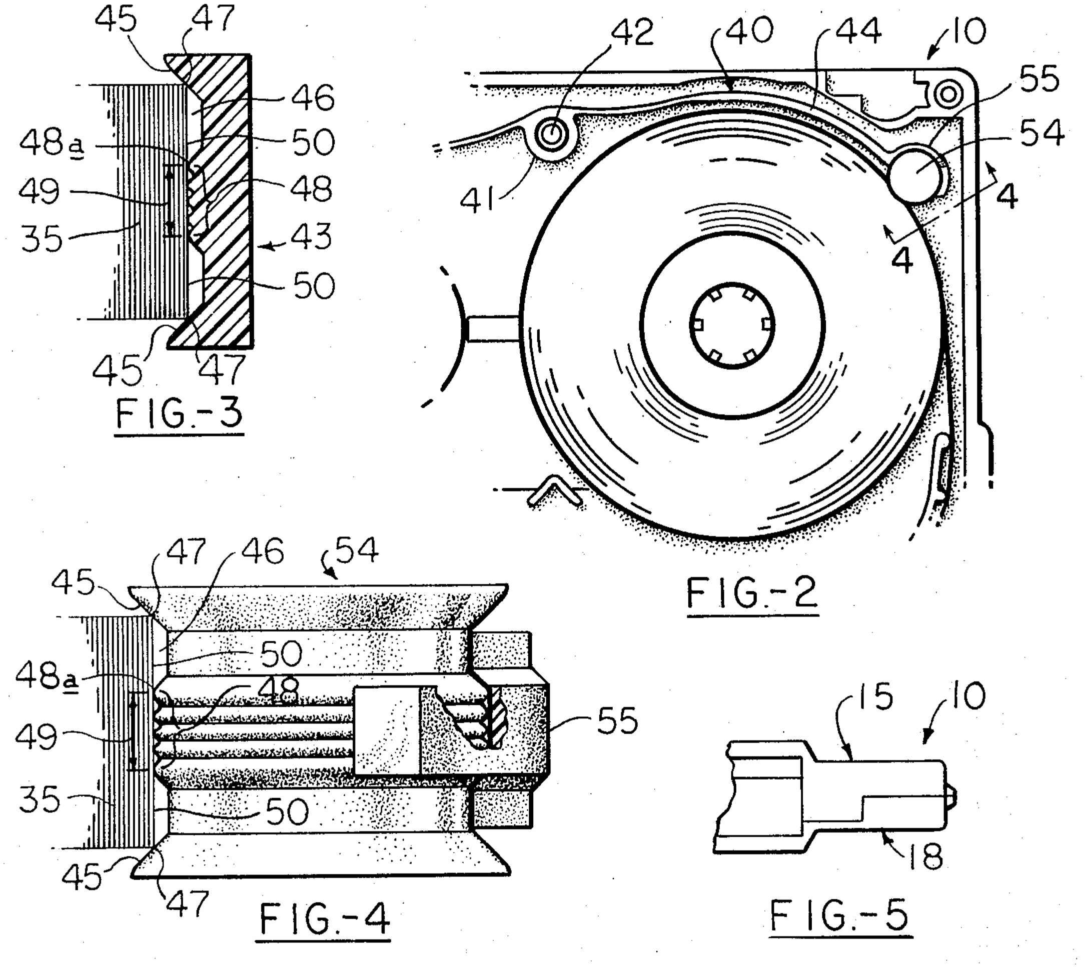
FIG. 2 is a view like FIG. 1 showing a modified form of the invention.
FIG. 3 is an enlarged section on lines 3—3 of FIG. 1.
FIG. 4 is an enlarged section on lines 4—4 of FIG. 2.
FIG. 5 is a fragmentary showing of a corner of the cassette assembly.

In accordance with the invention, an elongated cantilevered arm is provided to have a first portion supported in the case, and a second portion longitudinally spaced from the first portion to engage and bias the tape. In particular, the second portion defines a tape receiving channel, and has ribbing projecting in the channel to slidably engage and seat a non-track portion of the tape. In the example of FIGS. 1 and 3, the arm 40 has a first portion 41 which defines a fulchrum pivotally supported as by pin 42 in the case, allowing the arm to pivot as the tape is transported between the rolls 34 and 35. The arm itself may consist of molded plastic material, as for example Delrin which has low friction, high resilience properties.

The arm second portion 43 in the example of FIG. 1 is integral with the arm intermediate extent 44, and has opposed surfaces 45 which taper toward the interior of the channel 46 to seat against opposite edges 47 of the tape, and at a tape position of proximal medial engagement with the ribbing 48, crosswise of the tape width. Surfaces 45 may extend at about 45° angles, to funnel the tape into the position shown. Note the tape medial extent 49 directly opposite that ribbing which projects into the channel, whereby the tape tracks at zones 50 always remain out of rubbing or sliding engagement with the second portion 43 of the guide and bias arm, as referred to. This prevents inadvertent damage to the tracks as might otherwise be caused by frictional engagement and wear. Ribbing 48 may with unusual advantage comprise multiple laterally spaced ribs **48*a* which are elongated in the direction of tape relative travel through the channel 46**, to minimize rubbing engagement and wear.

The second portion of the arm may alternatively be defined by a roller 54 as seen in FIGS. 2 and 4, and be rotatable relative to the arm first portion 41 and intermediate extent 44. It is retained by the arm curved terminal 55 to be rotatable in response to travel of the tape in light frictional engagement with the roller, to minimize the restraint to tape travel. A cross section through the roller, as in FIG. 4, shows the same configuration as referred to in FIG. 3, and so bears the same numerals.

Referring back to FIG. 1, the arm is shown to have a third portion 56 which is the same in construction as portion 43, but spaced from the fulchrum portion directionally oppositely from the second portion 43. Arm extent 44*a* is like extent 44, and these are normally slightly flexed to exert force acting to keep portions 43 and 56 in light forcible engagement with the tape. The arm extends 44 and 44*a* are bowed outwardly to remain out of engagement with the tape rolls 34 and 35.

Finally, in FIG. 1, a V-shaped projection 60 in the case cradles the tape on a full roll to prevent spilling into area 61.

I claim:

1. For use in a magnetic tape cassette assembly having cover and receptacle elements defining a case with apertures along an edge thereof for exposing tape to contact with playback unit head means, and tape reel means mounted to rotate within the case, the improvement comprising a. an elongated cantilevered arm having a first portion to be supported in the case and having a second portion spaced from said first portion to engage and bias the tape, b. said second portion defining a tape receiving channel, and said second portion having elongated ribbing projecting in the channel to slidably engage and seat a non-track portion of the tape, said second portion also having transversely spaced and opposed surfaces which taper toward the interior of the channel to seat opposite edges of the tape at a tape position of proximal medial engagement with said ribbing, crosswise of the type width, the overall width of said ribbing being substantially less than the spacing between said surfaces, said ribbing confined to the medial portion of said space between said surfaces, said ribbing and surfaces being integral.

2. The improvement of claim 1 wherein the arm extent between said arm first and second portions is resiliently flexible in directions toward and away from the tape, and which is bowed to remain out of engagement with the tape roll on the reel means.

3. The improvement of claim 1 wherein the arm has a third portion like said second portion but spaced from the first portion directionally generally oppositely from the second portion, said second and third portions located to respectively engage the tape on two reels defined by said reel means.

4. The improvement of claim 1 wherein said first portion defines a fulchrum to be pivotally supported in the case.

5. The improvement of claim 1 wherein said second portion is integral with the arm, the arm consisting of molded plastic material.

6. The improvement of claim 1 wherein said second portion is rotatable relative to the first portion in response to travel of the tape in frictional engagement with said second portion.

7. The improvement of claim 4 including said tape cassette assembly pivotally supporting the arm fulchrum.

8. The improvement of claim 1 including said tape cassette assembly supporting the arm.

9. The improvement of claim 1 wherein said ribbing includes multiple laterally spaced ribs which are elongated in the direction of tape relative travel through the channel.

* * * * *